United States Patent [19]

Takeda et al.

[11] Patent Number: 4,816,875
[45] Date of Patent: Mar. 28, 1989

[54] SLIT ILLUMINATION SYSTEM FOR COPYING MACHINE AND THE LIKE

[75] Inventors: Katsuhiko Takeda, Okazaki; Kazuyuki Yoshida; Yamato Kitajima, both of Toyohashi, all of Japan

[73] Assignee: Minolta Camera Kabushiki Kaisha, Osaka, Japan

[21] Appl. No.: 179,517

[22] Filed: Apr. 8, 1988

Related U.S. Application Data

[63] Continuation of Ser. No. 88,825, Aug. 24, 1987, abandoned.

[30] Foreign Application Priority Data

Aug. 26, 1986 [JP] Japan ................... 61-200879

[51] Int. Cl.$^4$ ............................. G03B 27/54
[52] U.S. Cl. ........................ 355/67; 355/8; 362/346
[58] Field of Search ............... 355/8, 11, 67, 70, 63; 352/198; 362/308, 346; 350/525

[56] References Cited

U.S. PATENT DOCUMENTS

| | | | |
|---|---|---|---|
| 1,275,120 | 8/1918 | Ballman et al. | 362/308 |
| 1,763,630 | 4/1928 | Hopkins | 355/63 |
| 2,077,740 | 4/1937 | Caughlan | 362/346 |
| 3,720,460 | 3/1973 | Wilkinson | 352/198 |
| 3,920,311 | 11/1975 | Tsuda et al. | 350/525 |
| 3,982,116 | 9/1976 | Sakuma | 355/8 X |
| 4,225,923 | 9/1980 | Bloemendaal et al. | 355/67 X |
| 4,239,383 | 12/1980 | Peterson | 355/67 |
| 4,241,392 | 12/1980 | Boone | 355/67 X |
| 4,259,711 | 3/1981 | Mochizuki | 355/67 X |
| 4,295,186 | 10/1981 | Sugiura et al. | 355/67 X |
| 4,333,130 | 6/1982 | Mochizuki et al. | 355/67 X |
| 4,473,865 | 9/1984 | Landa | 355/67 X |
| 4,483,609 | 11/1984 | Harada | 355/67 X |
| 4,518,249 | 5/1985 | Murata et al. | 355/8 X |

FOREIGN PATENT DOCUMENTS 245685 11/1987 European Pat. Off. .............. 355/8

*Primary Examiner*—Richard A. Wintercorn
*Attorney, Agent, or Firm*—Price, Gess & Ubell

[57] ABSTRACT

A slit illumination system including a document support, a light source, a first elliptic mirror arranged at an opposite side to the document support with respect to the light source, an auxiliary mirror positioned at an opposite side to the first elliptic mirror with respect to the image light passage reflected by the document and a second elliptic mirror arranged at the side of the document with respect to the first elliptic mirror. The first elliptic mirror has a focussing line thereof positioned above or below the document and the second elliptic mirror has it positioned at the opposite side. The illumination light which is composed from the first elliptic mirror and from the second elliptic mirror through the auxiliary mirror has a flat top illumination intensity on the document.

11 Claims, 7 Drawing Sheets

SLIT ILLUMINATION SYSTEM FOR COPYING MACHINE AND THE LIKE

This is a continuation of application Ser. No. 088,825, filed on Aug. 24, 1987 now abandoned.

FIELD OF THE INVENTION

This invention relates generally to a slit illumination system for copying machines and the like, and more specifically, it relates to such a slit illumination system compressing light source; a main elliptic mirror for projecting part of the light beams issuing from the light source directly towards a document to be illuminated and a vice or supplemental elliptic mirror for projecting another part of said light beams indirectly through an auxiliary mirror towards the document.

BACKGROUND OF THE INVENTION

It has already been known to provide such a copying machine having a slit illumination system capable of projecting light beams issuing from a light source upon the document and further projecting the reflected light beams therefrom through a slit onto a photosensitive drum.

In FIG. 1, light passages in such conventional slit illumination system are shown only schematically. In this illumination system, part of the light beams delivered from exposure lamp $2a$ is condensingly reflected at a main elliptic mirror $3a$ and projected directly towards the surface of document $1as$, while another part of the projected light beams from the exposure lamp is condensingly reflected once at a vice elliptic mirror $4a$ towards a plane type auxiliary mirror $5a$ and again reflected by the latter towards the same document surface $1as$ from the opposite side, with respect to the position of main elliptic mirror $3a$ and about the slit center $Xa$, for illumination of the document surface $1as$ in the mode of a slit. In this way, the illumination is carried out from both sides of slit center $Xa$ of the illumination system. This illuminating arrangement and feature thereof are highly valuable, especially in the treatment of a book or the like voluminous document, by virtue of positive avoidance of shadow formation on the printed copies.

It should be noted that in such a slit illumination system as above referred to, the image focussing line of reflected light beams from main elliptic mirror $3a$ and that of another reflected light beams from vice elliptic mirror $4a$ are both above the glass-made, document table $1a$. In this respect, references may preferably be had to FIG. 2($a$) and FIG. 3($a$), respectively. As a result, respective illumination intensity curves of the illuminated areas on the document surface $1as$ by reflected lights from the both mirrors $3a$; $4a$ represent their peaks at small distances from the imaginary slit center plane $Xa$, upstream in this case therefrom, as shown in FIG. 2($b$) and FIG. 3($b$), respectively. Thus, the document has an illuminated slit-like area composed of these two illumination intensity curves, as shown in FIG. 4 drawn on a somewhat enlarged scale.

However, it is to be noted that the foregoing observation is only theoretical and of machine design aspect and, in practice, there are unavoidable machining and assemblying errors among exposure lamp $2a$, main elliptic mirror $3a$, vice elliptic mirror $4a$, auxiliary mirror $5a$ and a slit member, not shown, serving for slit image formation and that these errors may give rise to a slight shift of the illuminated region as hinted by that of illumination intensity curve from L to L' relative to the slit center line or plane $Xa$ in FIG. 5. Since the photosensitive drum, not shown, receives only slit-passed lights which are shown by a hatched area shown in the drawing, the very existence of said machining and assemblying errors will produce increase or decrease of projected light quantity on the drum, even among same model copying machines manufactured by a single manufacturing factory. As may be clearly seen, the now supposed case of FIG. 5 shows, however, a decrease in the projected light quantity only as an example thereof.

SUMMARY OF THE INVENTION

It is, therefore, a main object of the invention to provide such an improved slit illumination system as capable of obviating conventionally appearing fluctuations of projected light quantity on the document on account of unavoidable machining and assemblying errors of and among the related machine parts.

A further object of the present invention is to provide such an improved slit illumination system as providing a flat top illumination intensity curve of the projected lights on the document.

Another object of the present invention is to provide an improved slit illumination system having possible minimum overall sizes and, indeed, without reduction of projected light quantity.

A still further object of the invention is to provide an improved slit illumination system capable of providing a highly miniatured auxiliary reflecting mirror arranged at an opposite side to the projecting elliptic mirrors with respect to slit light passage reflected from the document. The foregoing objects can be well fulfilled according to the present invention by providing an improved slit illumination system arranged in the photocopying and the like machine, comprising:

- a document support means for supporting a document thereon;
- a light source;
- a first elliptic mirror, arranged at an opposite side to said document support means with respect to said light source, for directing part of the light delivered from said light source toward the document, said first elliptic mirror having a focussing line thereof defined at a position remote from a surface of said document support means on which the document is placed;
  - an auxiliary mirror positioned at an opposite side to said first elliptic mirror with respect to the image light passage reflected by the document; and
  - a second elliptic mirror, arranged at the side of said document support means with respect to said first elliptic mirror, for directing another part of light delivered from said light source toward the document through said auxiliary mirror, said second elliptic mirror having a focussing line thereof defined at an opposite side to said focussing line of said first elliptic mirror with respect to said surface of said document support means.

BRIEF DESCRIPTION OF THE DRAWINGS

These and further objects, features and merits of the present invention will become more apparent from the following description of several preferred embodiments thereof taken in conjunction with the accompanying drawings, in which.

In the following description, like parts are designated by like reference numerals throughout the several drawings.

PREFERRED EMBODIMENTS OF THE INVENTION

Now referring to the remaining drawings, preferred embodiments of the invention will be set forth more in detail.

Figure 6:
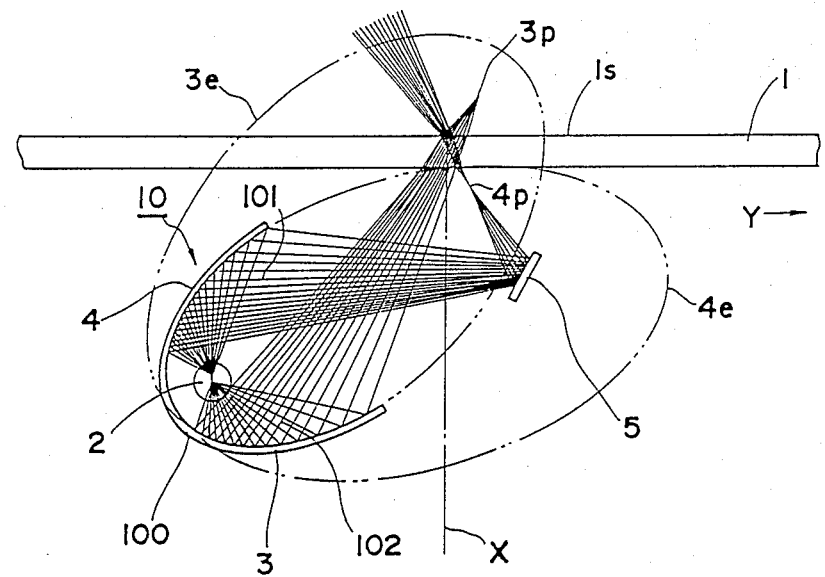
FIG. 6 is a schematic section view of a preferred embodiment of the slit illumination system according to the present invention.

In FIG. 6, numeral 1 represents a transparent document table, the document per se being not shown only for convenience, preferably made of glass, acrylic resin or the like material.

At a certain predetermined distance from and below the document table 1, an exposure lamp 2 of conventional design is provided, the mounting means and a current source therefor have been omitted since they are a known design and arrangement which can be adopted therein. An elliptic mirror type reflector 10 is provided so as to cover one side of the exposure lamp 2, the reflector 10 comprising a main reflector element 3, the cross-section of which is in correspondence with a part of a first ellipse 3e, and a vice reflector element 4, the cross-section of which is in correspondence with a part of a second ellipse 4e. The center of exposure lamp 2 is arranged to be in correspondence to the common focus of the said two ellipses 3e and 4e. Main reflector element and vice reflector element are conjointed at 100.

Numeral 5 represents an auxiliary reflector of a plane mirror type which is arranged as shown to re-reflect light beams 101 originally delivered from lamp 2 and once reflected from the vice reflector 4 arranged nearer to document table 1 than main reflector 3, the thus re-reflected light beams 101 being directed towards the table 1. For this purpose, auxiliary reflector 5 is arranged at the opposite side relative to the main reflector and about an plane X corresponding to the slit center appearing on the document table 1, as is commonly adopted in the conventional slit exposure system although not specifically shown.

On the other hand, part of the projected light beams from the lamp 2 are reflected by the main mirror 3, so as to condense at a focussing line 3p positioned at a small distance above the upper surface 1s of document table 1 and extending perpendicular to the drawing paper and in parallel to said table surface 1s. In this way, the presently reflected light beams 102 will appear on the document mounting table surface 1s in the form of a narrow slit taking the slit center X as the center of the slit, as will be more fully and specifically set forth hereinafter.

On the contrary, the projected and reflected light beams 101 are re-reflected at the plane mirror 5 and condensed at the focussing line 4p which is positioned at a small distance from and below the upper surface 1s of document table 1 and extends in parallel thereto, although not specifically shown. The thus focussed light bundle is subjected to a slight dispersion and penetrates through the transparent solid material of table 1 while being refracted at the entrance. Accordingly a narrow slit illumination band appearing at the upper table surface 1s, taking the focussing lines 3p, 4p the small distances therefrom, as will be more fully described hereinafter.

Figure 7A:
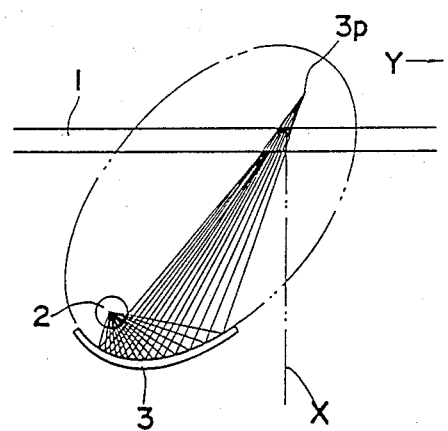
FIG. 7(a) is a schematic section view showing light passage of lights reflected from a main elliptic mirror adopted in the inventive system.
Figure 7B:
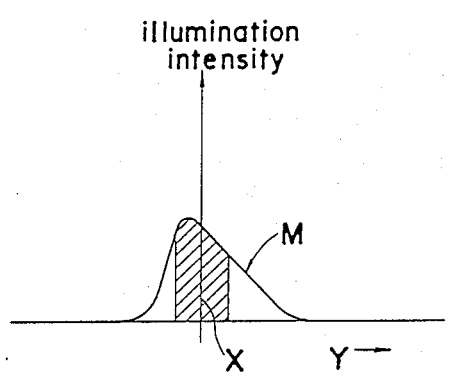
FIG. 7(b) is an illumination intensity distribution curve of focussed light corresponding to FIG. 7(a).
Figure 8A:
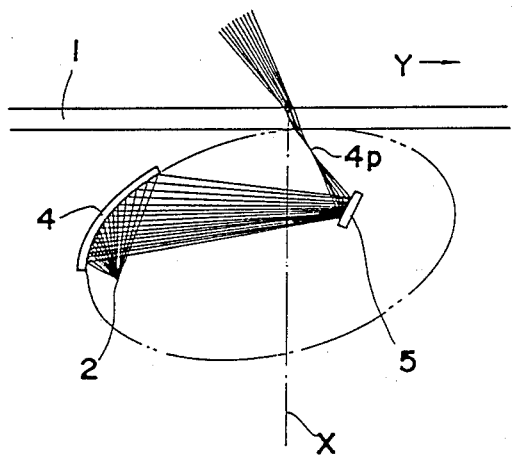
FIG. 8(a) is a schematic section view showing light passage of the lights reflected from a supplemental elliptic mirror employed in the inventive system.
Figure 8B:
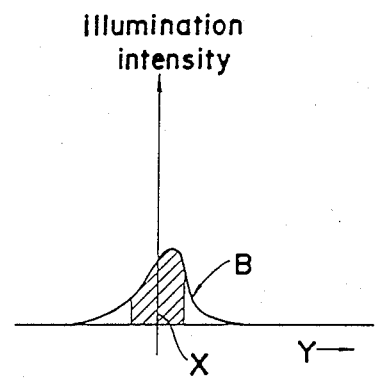
FIG. 8(b) is an illumination intensity distribution curve of focussed light corresponding to FIG. 8(a).

The slit projecting modes of main reflector 3 and vice projector 4 are shown more specifically at FIG. 7(a) and FIG. 8(a), respectively, while the illumination intensity curves of the projected slits appearing at the document mounting table surface 1s and taking the slit center X as respective centers corresponding thereto are shown in FIGS. 7(b) and 8(b), respectively.

As shown in FIG. 7(b), the illumination intensity distribution of first reflected light beams from main reflector 3 describes such a curve M as having a maximum peak appearing at an upstream point relative to the slit center plane X when seen in the image scanning direction Y, while in FIG. 8(b), the illumination intensity distribution curve B of second reflected light beams successively from vice reflector 4 and plane mirror 5 shows a maximum peak appearing at a downstream point relative to the slit center plane X when seeing in the image scanning direction Y.

Figure 5:
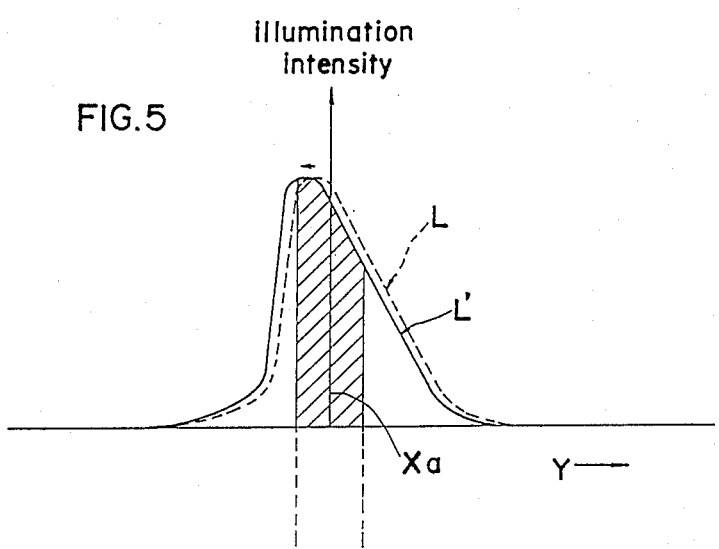
FIG. 5 is a similar composed diagram shown in FIG. 4, for comparative showing of a slightly offset illumination intensity distribution curve caused by machining and/or assemblying errors of related parts.

In practice, the document-mounting surface 1s or the document, not shown, will be optically exposed with an illumination intensity distribution curve F, as shown in FIG. 5, which is composed of the foregoing both curves M and B and having a flat top portion f substantially symmetrical when seen in the scanning direction Y and taking the slit center plane X as the symmetry plane. Thus, the quantity of lights reflected by the document and projected on the drum surface may be defined by a rectangular area Z, shown in FIG. 9, having a width α, amounting preferably to 5-10 mm.

Figure 9:
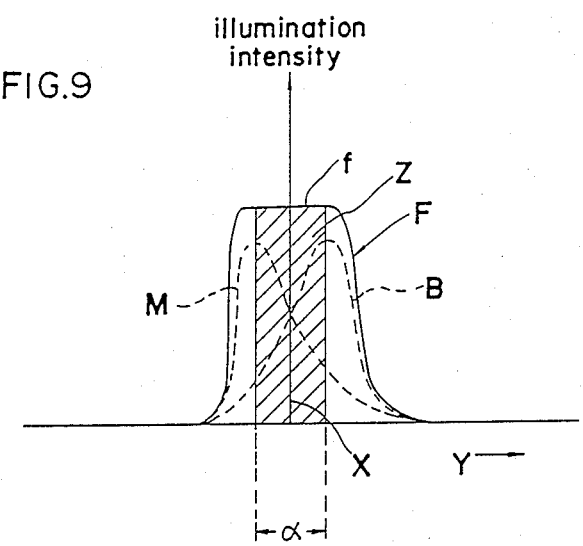
FIG. 9 is an illumination intensity distribution curve substantially composed of two curves shown in FIG. 7(b) and FIG. 8(b).
Figure 10:
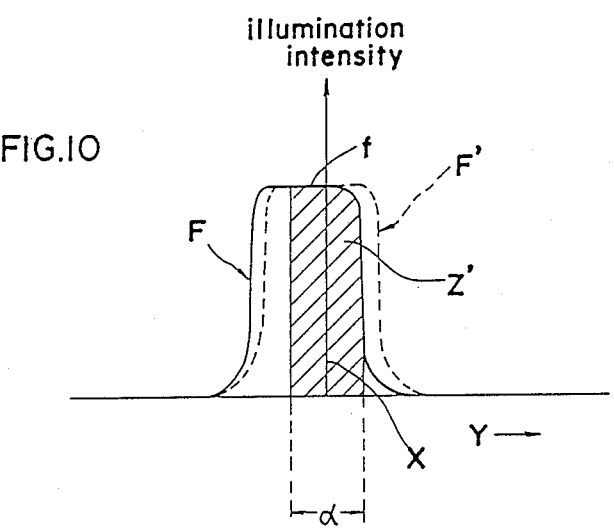
FIG. 10 shows a modified chart from that shown in FIG. 9, showing an offsetting effect caused by machining and assemblying minor errors of related parts.

As shown by way of example in FIG. 10, and since top portion f of the light quantity curve F will be kept substantially at top flat state without appreciable change, even if there be certain machining and/or assemblying errors among related parts and even when the curve F should have been subjected to certain shifting in the direction of scanning Y to F', the light quantity expressed by the resulted hatched area Z' will remain substantially equal to the foregoing one Z shown and described with reference to FIG. 9 and as repeatedly shown in FIG. 10 only for the purpose of comparison. Thus, as is employed in the present embodiment, using two document exposure units having focussing lines arranged at mutually opposite sides of the document mounting desk surface ls or las, the light quantity projected upon the photosensitive drum surface will remain substantially constant, thus otherwise liable and disadvantageous occurrence of individual difference in printing performance caused to appear even with same model copying machines being obviated to a substantial degree.

In addition to the substantial unification of document illumination intensity when seen in the scanning direction, a substantial increase of reflection efficiency of the plane mirror 5 and at the same time a substantial miniaturization thereof can be realized according to this invention, which means a considerable progress in the art.

Figure 1:
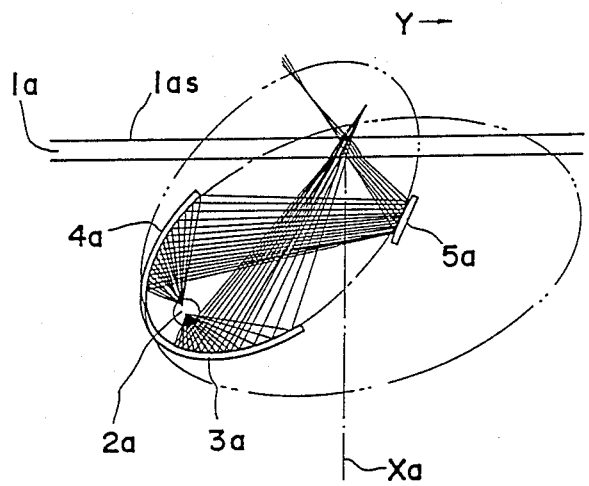
FIG. 1 is a schematic section view, in principle only, of a comparative conventional slit illumination system.
Figure 2A:
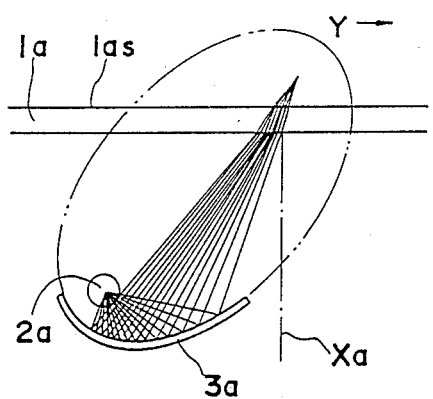
FIG. 2(a) is a schematic section view, illustrating light passages relative to a main elliptic mirror only employed in the conventional slit illumination system shown in FIG. 1.
Figure 2B:
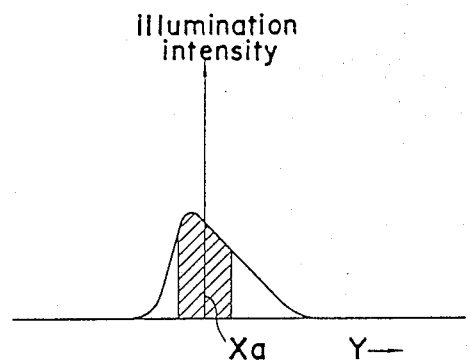
FIG. 2(b) is a diagram showing an illumination intensity curve of the projected lights on the document in the case of the system shown in FIG. 2(a).
Figure 3A:
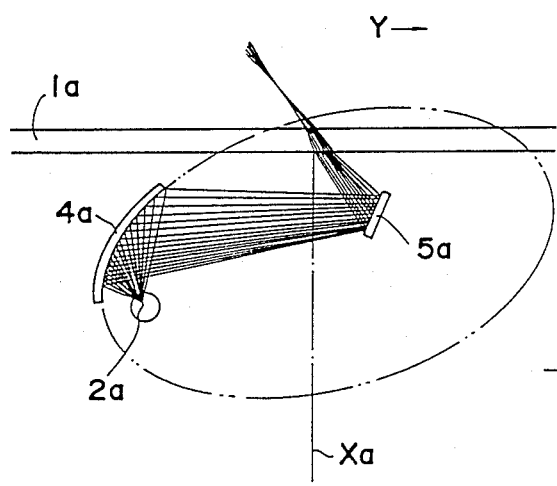
FIG. 3(a) is a schematic view, illustrating light passages relative to a vice elliptic mirror only employed in the conventional system shown in FIG. 1.
Figure 3B:
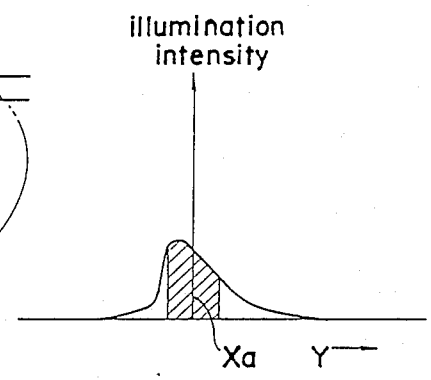
FIG. 3(b) is a diagram showing an illumination intensity distribution curve of the projected lights on the document in the case of the system shown in FIG. 3(a).
Figure 4:
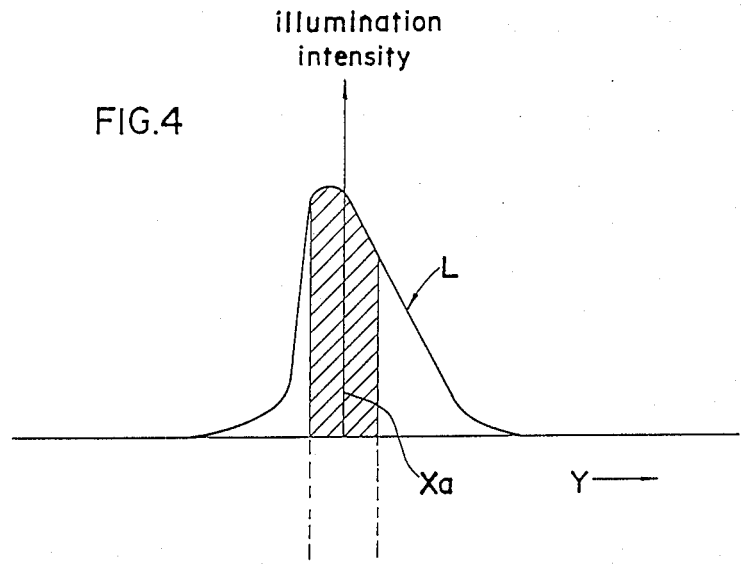
FIG. 4 is a diagram composed of two foregoing diagrams shown in FIG. 2(b) and FIG. 3(b).

More specifically, it should be noted that the light passage distance between exposure lamp 2 and document-mounting surface ls can not be shortened more than a predetermined amount without accompanying the ripples so called of the lamp segment(s). Thus, when focussing line of vice reflecting mirror 4a is positioned at a certain distance above the document-mounting surface las, as in the prior art arrangement shown in FIG. 3(a), the overall size of the ellipse defining the vice mirror 4a will become rather larger than that appearing in the present invention wherein the focussing line has been positioned at a distance below the document-bearing surface, as shown in FIG. 8(a). On the other hand, it should be further noted that the upper end portion of the vice reflecting mirror 4a; 4 is influenced by certain mechanism members having no direct relationship with the lower surface of the glass-made document desk as well as document scanning mechanism, especially at or nearly at the end of the scanning operation. When it is assumed that by an imaginary common plane positioned at a constant distance below the document-mounting surface las; 1s and extending in parallel thereto, the vice reflecting mirrors 4a; 4 are cut, the inventive arrangement can collect considerably larger light quantity than in the conventional case. Therefore, in the case of the inventive arrangement, overall dimensions of the optical system can be correspondingly minimized without reduction of the illumination light quantity in comparison with the comparative prior art arrangement. Further, in the inventive arrangement, since the focussing line 4p of the vice reflecting mirror 4 acting optically through the intermediary of plane mirror 5 is positioned at a certain distance below document-mounting surface 1s, and the mirror 5 per se is mounted at a rather lower position in comparison with the prior art arrangement and in addition, the distance between plane mirror 5 and focussing line 4p can be set to a considerably shorter value, resulting in the plane mirror 5 per se being made to be rather miniaturized advantageously.

Figure 11:
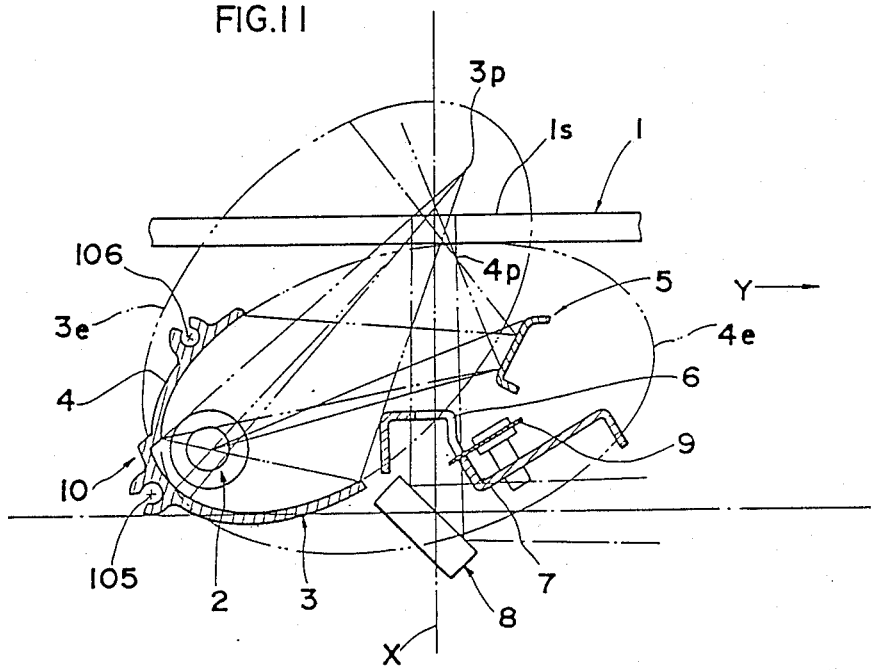
FIG. 11 is a schematic section view of another, somewhat detailed embodiment of the invention.

In the modification shown in FIG. 11, an elliptic mirror 10 is provided, so as to surround a substantial part of the circumference of the exposure lamp 2, the mirror 10 comprising a main reflecting mirror element 3 forming a part of an ellipse 3e, when seen in cross-section of the mirror 3, and a vice reflecting mirror element 4 forming a part of another ellipse 4e, when seen in cross-section of the mirror 4, the both ellipse 3e; 4e having a common focus which is in coincidence with the light delivery center of the exposure lamp 2. For this purpose, these mirror elements 3; 4 may preferably be rigidly or otherwise relatively movably connected with each other as shown and provided with a fine adjustment means partially shown at 105 and 106 for attaining above said coincidence.

There is provided further an auxiliary reflecting mirror 5, called "book-reflecting" mirror, of a plate or plane type, which serves for deflecting the reflected lamp lights from the vice mirror 4 positioned at an opposite relation to the main mirror 3 and at a nearer position relative thereto and when seen towards the document-mounting glass table 1. Between main mirror 3 and auxiliary mirror 5, there is provided a slit member 7 kept at a generally fixed position and being formed with a slit per se 6 for allowing the reflected light beams from the document as precisely corresponding to the specified slit width α to pass therethrough and towards a first mirror 8 which is arranged at an inclining angle position 45° relative to an imaginary plane parallel to the document-mounting table surface 1s. The lights passed through the slit per se are deflectingly reflected at the first mirror and delivered along a parallel plane, as suggested in FIG. 11 by a small arrow Y. Numeral 9 represents a light distribution range adjuster which is adjustably mounted at its one end by a screw or the like member, and serves for positional adjustment of the slit member 7 in the lengthwise direction of the slit per se and thus in the perpendicular direction to the drawing paper and in the lateral direction relative to the document mounting surface ls of the document desk, for the purpose of regulating the light passage quantity.

Figure 12:
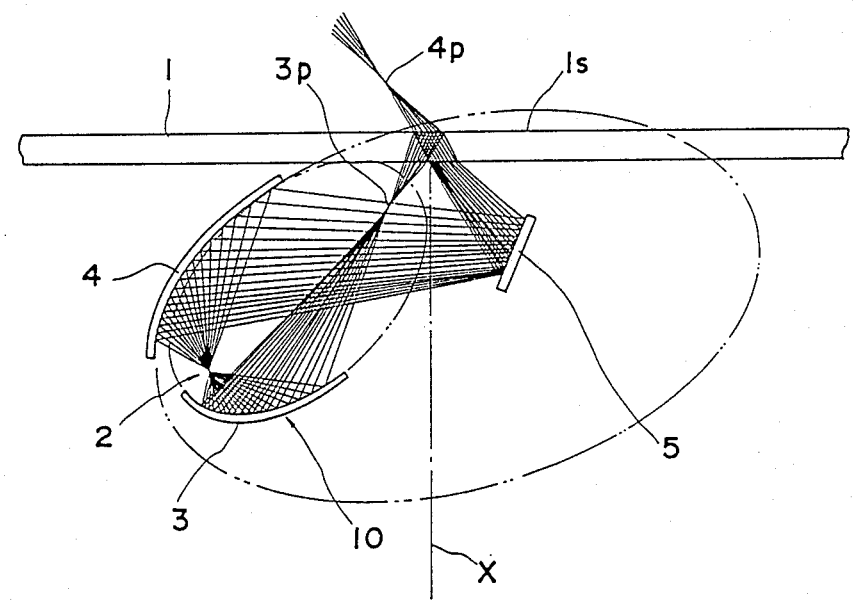
FIG. 12 is a schematic view showing a still another embodiment of the invention.

FIG. 12 shows schematically a modification from the foregoing.

In the present case, the first focussing line 3p and the second focussing line 4p have been positionally exchanged with each other relative to the document-mounting surface 1s and with equal results. More specifically, the first focussing line 3p of the main reflecting mirror is positioned below the document-mounting surface 1s, while the second focussing line 4p of the vice reflecting mirror 4 acting through an intermediate plane mirror 5 is positioned above the document-mounting surface 1s, so as to provide again a flat top effect of a document illumination intensity distribution curve, although the latter has been omitted on account of easy supposition thereof from the foregoing description of other embodiments.

Although it has been set forth in the foregoing embodiments and modifications that there are provided two singular focussing lines which are arranged separately at the both sides or below and above the document-mounting surface. However, the main or vice reflecting mirror may be of the split type, thus each comprising several constitutional elements having successively varying focusses. In this case, although not shown, the auxiliary plane mirror may have equally split mode mirror elements.

Further, although in the foregoing description, the document table has been set forth as stationary. However, in practice, the document table may be of the movable type, if wanted, while the light exposure means may be of a stationary type, and without departing from the gist and spirit of the present invention.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A slit illumination system comprising:
    a document support means for supporting a document thereon;
    a light source;
    a first elliptic mirror, arranged at an opposite side to said document support means with respect to said light source, for directing part of the light delivered from said light source toward the document, said first elliptic mirror having a focussing line thereof defined at a position remote from a surface of said document support means on which the document is placed;
    an auxiliary mirror positioned at an opposite side to said first elliptic mirror with respect to the image light passage reflected by the document; and
    a second elliptic mirror, arranged at the side of said document support means with respect to said first elliptic mirror, for directing another part of light delivered from said light source toward the document through said auxiliary mirror, said second elliptic mirror having a focussing line thereof defined at an opposite side to said focussing line of said first elliptic mirror with respect to said surface of said document support means.

2. A slit illumination system as claimed in claim 1, wherein said first elliptic mirror has the focussing line thereof positioned above said surface of said document support means and said second elliptic mirror has the focussing line thereof positioned therebelow.

3. A slit illumination system as claimed in claim 1, wherein said first elliptic mirror has the focussing line thereof positioned below said surface of said document support means and said second elliptic mirror has the focussing line thereof positioned thereabove.

4. A slit illumination system as claimed in claim 1, wherein said first and second elliptic mirrors are formed integrally.

5. A slit illumination system as claimed in claim 1, wherein said first and second elliptic mirrors are arranged so as to have the common focus of the ellipses at which the center of said light source is positioned.

6. A slit illumination system comprising:
    a document support means for supporting a document thereon;
    a light source;
    a first elliptic mirror, arranged at an opposite side to said document support means with respect to said light source, for directing part of light delivered from said light source toward the document, said first elliptic mirror having a focussing line thereof positioned above a surface of said document support means on which the document is placed;
    an auxiliary mirror positioned at an opposite side to said first elliptic mirror with respect to the image light passage reflected by the document; and
    a second elliptic mirror, arranged at the side of said document support means with respect to said first elliptic mirror, for directing another part of light delivered from said light source toward the document through said auxiliary mirror, said second elliptic mirror having a focussing line thereof positioned below said surface of said document support means, wherein the illumination light which is composed of the light from said first elliptic mirror and from said second elliptic mirror through said auxiliary mirror has a flat top illumination intensity on said surface.

7. A slit illumination system as claimed in claim 6, wherein said first and second elliptic mirrors are formed integrally.

8. A slit illumination system as claimed in claim 6, wherein said first and second elliptic mirrors are arranged so as to have the common focus of the ellipses at which the center of said light source is positioned.

9. A slit illumination system comprising:
    a document support means for supporting a document thereon;
    a light source;
    a first elliptic mirror, arranged at an opposite side to said document support means with respect to said light source, for directing part of the light delivered from said light source toward the document, first elliptic mirror having a focussing line thereof positioned below a surface of said document support means on which the document is placed;
    an auxiliary mirror positioned at an opposite side to said first elliptic mirror with respect to the image light passage reflected by the document; and
    a second elliptic mirror, arranged at the side of said document support means with respect to said first elliptic mirror, for directing another part of light delivered from said light source toward the document through said auxiliary mirror, said second elliptic mirror having a focussing line thereof positioned above said surface of said document support means, wherein the illumination light which is composed of the light from said first elliptic mirror and from said second elliptic mirror through said auxiliary mirror has a flat top illumination intensity on said surface.

10. A slit illumination system as claimed in claim 9, wherein said first and second elliptic mirrors are formed integrally.

11. A slit illumination system as claimed in claim 9, wherein said first and second elliptic mirrors are arranged so as to have the common focus of the ellipses at which the center of said light source is positioned.

* * * * *